US012790989B2

(12) United States Patent
Kimura et al.

(10) Patent No.: US 12,790,989 B2
(45) Date of Patent: Nov. 10, 2026

(54) EXHAUST GAS PURIFICATION DEVICE, EXHAUST GAS PURIFICATION METHOD, AND CONTROL DEVICE

(71) Applicant: Komatsu Ltd., Tokyo (JP)

(72) Inventors: Mitsuyoshi Kimura, Tokyo (JP); Tatsuya Yoshida, Tokyo (JP)

(73) Assignee: KOMATSU LTD., Tokyo (JP)

( * ) Notice: Subject to any disclaimer, the term of this patent is extended or adjusted under 35 U.S.C. 154(b) by 146 days.

(21) Appl. No.: 18/872,225

(22) PCT Filed: Aug. 18, 2023

(86) PCT No.: PCT/JP2023/029884

§ 371 (c)(1),
(2) Date: Dec. 5, 2024

(87) PCT Pub. No.: WO2024/053365

PCT Pub. Date: Mar. 14, 2024

(65) Prior Publication Data

US 2026/0243204 A1 Aug. 20, 2026

(30) Foreign Application Priority Data

Sep. 5, 2022 (JP) ................................ 2022-140700

(51) Int. Cl.
*F02D 9/04* (2006.01)
*F01N 3/10* (2006.01)
(Continued)

(52) U.S. Cl.
CPC ............... *F02D 9/04* (2013.01); *F01N 3/106* (2013.01); *F01N 3/18* (2013.01); *F01N 3/2066* (2013.01);
(Continued)

(58) Field of Classification Search
CPC ... F02D 9/04; F01N 3/106; F01N 3/18; F01N 3/2066; F01N 3/208; F01N 3/2892;
(Continued)

(56) References Cited

U.S. PATENT DOCUMENTS 8,931,263 B2 * 1/2015 Ikeda ........................ F02D 9/06 60/285
2003/0172644 A1 9/2003 Minami
(Continued)

FOREIGN PATENT DOCUMENTS

CN 113006950 A 6/2021
JP 2002-349239 A 12/2002
(Continued)

*Primary Examiner* — Mary A Davis
(74) *Attorney, Agent, or Firm* — Troutman Pepper Locke LLP

(57) ABSTRACT

An exhaust gas purification device includes a throttle valve provided in a path through which an exhaust gas discharged from an engine flows, a rotational speed of the engine being controlled in accordance with an operation of an accelerator, a diesel oxidation catalyst device disposed on a downstream side of the throttle valve, a selective reduction catalyst device disposed on a downstream side of the diesel oxidation catalyst device, a fuel injection device that injects fuel on an upstream side of the diesel oxidation catalyst device, and a control device that inputs temperature data indicating an inlet temperature and an outlet temperature of the diesel oxidation catalyst device and controls the throttle valve and the fuel injection device.

9 Claims, 10 Drawing Sheets

(51) Int. Cl.
*F01N 3/18* (2006.01)
*F01N 3/20* (2006.01)
*F01N 3/28* (2006.01)
*F01N 13/00* (2010.01)

(52) U.S. Cl.
CPC ........... *F01N 3/208* (2013.01); *F01N 3/2892* (2013.01); *F01N 13/009* (2014.06); *F01N 2610/03* (2013.01); *F01N 2900/10* (2013.01); *F01N 2900/1404* (2013.01); *F01N 2900/1602* (2013.01)

(58) Field of Classification Search
CPC ............... F01N 13/009; F01N 2610/03; F01N 2900/10; F01N 2900/1404; F01N 2900/1602
See application file for complete search history.

(56) References Cited

U.S. PATENT DOCUMENTS

| | | | |
|---|---|---|---|
| 2017/0145885 | A1 | 5/2017 | Ito et al. |
| 2021/0310390 | A1 | 10/2021 | Sato et al. |

FOREIGN PATENT DOCUMENTS

| | | | | |
|---|---|---|---|---|
| JP | 2012031798 | A | * | 2/2012 |
| JP | 2014-025455 | A | | 2/2014 |
| JP | 5987133 | B | | 9/2016 |
| JP | 2018-193886 | A | | 12/2018 |
| JP | 2020-041461 | A | | 3/2020 |
| WO | 2016/068347 | A1 | | 5/2016 |

* cited by examiner

FIG. 5

| CONDITION NAME | CONTENTS |
| --- | --- |
| AUTOMATIC REPRODUCTION CONTROL START CONDITION | IN CASE WHERE ELAPSED TIME FROM END OF PREVIOUS REPRODUCTION OPERATION REACHES FIRST SETTING TIME T1, IN CASE WHERE DENITRIFICATION EFFICIENCY CALCULATED FROM MEASUREMENT DATA OF NOx SENSOR IS EQUAL TO OR LESS THAN THRESHOLD VALUE, OR LIKE |
| AUTOMATIC REPRODUCTION CONTROL END CONDITION | IN CASE WHERE FIRST INTEGRATION TIME (REPRODUCTION TIME) OBTAINED BY INTEGRATING TIME AT WHICH DOC OUTLET TEMPERATURE IS EQUAL TO OR HIGHER THAN REPRODUCTION DETERMINATION TEMPERATURE $\theta 1$ IS EQUAL TO OR LONGER THAN FIRST DETERMINATION TIME T11 |
| FIRST CONDITION FOR STATIONARY MANUAL REPRODUCTION CONTROL REQUEST | IN CASE WHERE, DURING AUTOMATIC REPRODUCTION CONTROL, FIRST INTEGRATION TIME IS SHORTER THAN FIRST DETERMINATION TIME T11 AND ELAPSED TIME FROM START OF AUTOMATIC REPRODUCTION IS EQUAL TO OR LONGER THAN SECOND DETERMINATION TIME T12, OR LIKE |
| SECOND CONDITION FOR STATIONARY MANUAL REPRODUCTION CONTROL REQUEST | IN CASE WHERE, DURING AUTOMATIC REPRODUCTION CONTROL,FIRST INTEGRATION TIME IS SHORTER THAN FIRST DETERMINATION TIME T11 AND SECOND INTEGRATION TIME OBTAINED BY INTEGRATING TIME AT WHICH DOC OUTLET TEMPERATURE IS LOWER THAN REPRODUCTION DETERMINATION TEMPERATURE $\theta 1$ DURING FUEL DOSING (DURING PERIOD AT WHICH DOC INLET TEMPERATURE IS EQUAL TO OR HIGHER THAN SET TEMPERATURE) IS EQUAL TO OR LONGER THAN THIRD DETERMINATION TIME T13 |
| STATIONARY MANUAL REPRODUCTION CONTROL START CONDITION | IN CASE WHERE STATIONARY MANUAL REPRODUCTION SWITCH IS PRESSED BY OPERATOR AND WORK VEHICLE IS IN STATE WHERE STATIONARY MANUAL REPRODUCTION CAN BE PERFORMED (STATE WHERE STATIONARY MANUAL REPRODUCTION CAN BE PERFORMED IS, FOR EXAMPLE, STATE WHERE WORK VEHICLE IS STOPPED AND NOT OPERATED, SUCH AS STATE WHERE PARKING BRAKE IS OPERATED, ACCELERATOR IS IN OFF STATE, AND WORK MACHINE LEVER IS IN NEUTRAL POSITION) |
| STATIONARY MANUAL REPRODUCTION CONTROL END CONDITION | SAME AS AUTOMATIC REPRODUCTION CONTROL END CONDITION |

FIG. 9

| VEHICLE SAFETY STATE CONDITION (EXAMPLE 1) | CONDITION (1) IS ESTABLISHED AND CONDITION (2-1) IS ESTABLISHED |
|---|---|
| CONDITION (1) | ACCELERATOR OPENNESS IS EQUAL TO OR SMALLER THAN ACCELERATOR OPENNESS THRESHOLD VALUE FOR SAFETY STATE DETERMINATION |
| CONDITION (2-1) | SHIFT LEVER IS IN N AND PARKING BRAKE IS OPERATING |

FIG. 10

| VEHICLE SAFETY STATE CONDITION (EXAMPLE 2) | CONDITION (1) IS ESTABLISHED AND CONDITION (2-2) IS ESTABLISHED |
|---|---|
| CONDITION (1) | ACCELERATOR OPENNESS IS EQUAL TO OR SMALLER THAN ACCELERATOR OPENNESS THRESHOLD VALUE FOR SAFETY STATE DETERMINATION |
| CONDITION (2-2) | TRAVEL LOCK IS ON AND WORK MACHINE LOCK IS ON |

FIG. 11

| VEHICLE SAFETY STATE CONDITION (EXAMPLE 3) | CONDITION (1) IS ESTABLISHED AND CONDITION (2-3) IS ESTABLISHED |
|---|---|
| CONDITION (1) | ACCELERATOR OPENNESS IS EQUAL TO OR SMALLER THAN ACCELERATOR OPENNESS THRESHOLD VALUE FOR SAFETY STATE DETERMINATION |
| CONDITION (2-3) | WORK MACHINE LOCK IS ON |

FIG. 12

ETV OPENNESS MAP1 (WHEN VEHICLE SAFETY STATE CONDITION IS NOT ESTABLISHED)

| ETV OPENNESS [%] (0: FULLY OPEN, 100: FULLY CLOSED) | | ENGINE ROTATIONAL SPEED [$min^{-1}$] | | | | | | | |
|---|---|---|---|---|---|---|---|---|---|
| | | 600 | 800 | 1000 | 1200 | 1400 | 1600 | 1800 | 2000 |
| ENGINE TORQUE [Nm] | 0 | 86 | 86 | 86 | 84 | 82 | 80 | 80 | 80 |
| | 200 | 86 | 86 | 86 | 84 | 82 | 80 | 80 | 80 |
| | 400 | 86 | 86 | 86 | 84 | 82 | 80 | 80 | 80 |
| | 600 | 80 | 80 | 80 | 78 | 76 | 74 | 74 | 74 |
| | 800 | 70 | 70 | 70 | 68 | 66 | 64 | 64 | 64 |
| | 1000 | 40 | 40 | 40 | 38 | 36 | 34 | 34 | 34 |

FIG. 13

ETV OPENNESS MAP2 (WHEN VEHICLE SAFETY STATE CONDITION IS ESTABLISHED)

| ETV OPENNESS [%] (0: FULLY OPEN, 100: FULLY CLOSED) | | ENGINE ROTATIONAL SPEED [$min^{-1}$] | | | | | | | |
|---|---|---|---|---|---|---|---|---|---|
| | | 600 | 800 | 1000 | 1200 | 1400 | 1600 | 1800 | 2000 |
| ENGINE TORQUE [Nm] | 0 | 95 | 95 | 95 | 95 | 82 | 80 | 80 | 80 |
| | 200 | 95 | 95 | 95 | 95 | 82 | 80 | 80 | 80 |
| | 400 | 95 | 95 | 95 | 95 | 82 | 80 | 80 | 80 |
| | 600 | 80 | 80 | 80 | 78 | 76 | 74 | 74 | 74 |
| | 800 | 70 | 70 | 70 | 68 | 66 | 64 | 64 | 64 |
| | 1000 | 40 | 40 | 40 | 38 | 36 | 34 | 34 | 34 |

EXHAUST GAS PURIFICATION DEVICE, EXHAUST GAS PURIFICATION METHOD, AND CONTROL DEVICE

TECHNICAL FIELD

The present disclosure relates to an exhaust gas purification device, an exhaust gas purification method, and a control device.

Priority is claimed on Japanese Patent Application No. 2022-140700, filed on Sep. 5, 2022, the content of which is incorporated herein by reference.

BACKGROUND ART

Patent Documents 1 to 3 disclose technologies of controlling an exhaust throttle valve (throttle valve) or the like provided in an exhaust path of a diesel engine to raise the temperature of an exhaust gas and reproduce an exhaust gas purification device.

CITATION LIST

Patent Documents

Patent Document 1: Japanese Unexamined Patent Application, First Publication No. 2002-349239

Patent Document 2: PCT International Publication WO2016/068347 (Japanese Patent No. 5987133)

Patent Document 3: Japanese Unexamined Patent Application, First Publication No. 2020-41461

SUMMARY OF INVENTION

Technical Problem

However, since the exhaust throttle valve is provided in a path through which the exhaust gas discharged from the engine flows as disclosed in Patent Document 3, the use environment is unstable as compared with an intake throttle valve provided in an intake path through which air is sent to the engine. Therefore, the exhaust gas may have a high temperature and a high pressure, for example, in association with the control of throttling the openness of the exhaust throttle valve. Thus, in the control of throttling the openness of the exhaust throttle valve, there is a problem that the openness needs to be appropriately controlled so that the components such as the engine and a post-processing device are not damaged.

The present disclosure has been made in view of the above circumstances, and an object of the present disclosure is to provide an exhaust gas purification device, an exhaust gas purification method, and a control device capable of appropriately controlling an openness of an exhaust throttle valve.

Solution to Problem

In order to solve the above-described problem, according to an aspect of the present disclosure, there is provided an exhaust gas purification device including: a throttle valve configured to be provided in a path through which an exhaust gas discharged from an engine flows, a rotational speed of the engine being controlled in accordance with an operation of an accelerator; a diesel oxidation catalyst device configured to be disposed on a downstream side of the throttle valve; a selective reduction catalyst device configured to be disposed on a downstream side of the diesel oxidation catalyst device; a fuel injection device configured to inject fuel on an upstream side of the diesel oxidation catalyst device; an inlet temperature sensor configured to measure an inlet temperature of the diesel oxidation catalyst device; an outlet temperature sensor configured to measure an outlet temperature of the diesel oxidation catalyst device; and a control device configured to input temperature data measured by the inlet temperature sensor and the outlet temperature sensor and control the throttle valve and the fuel injection device, in which, in a case of performing control of throttling the throttle valve, the control device changes an upper limit value of a valve openness when a fully closed condition of the throttle valve is set as a maximum value of the valve openness and a fully open condition of the throttle valve is set as a minimum of the valve openness, based on a determination result based on an accelerator openness of the accelerator and operation conditions of one or more operation devices different from the accelerator.

In addition, according to another aspect of the present disclosure, an exhaust gas purification method is a control method of an exhaust gas purification device including a throttle valve configured to be provided in a path through which an exhaust gas discharged from an engine flows, a rotational speed of the engine being controlled in accordance with an operation of an accelerator, a diesel oxidation catalyst device configured to be disposed on a downstream side of the throttle valve, a selective reduction catalyst device configured to be disposed on a downstream side of the diesel oxidation catalyst device, a fuel injection device configured to inject fuel on an upstream side of the diesel oxidation catalyst device, an inlet temperature sensor configured to measure an inlet temperature of the diesel oxidation catalyst device, an outlet temperature sensor configured to measure an outlet temperature of the diesel oxidation catalyst device, and a control device configured to input temperature data measured by the inlet temperature sensor and the outlet temperature sensor and control the throttle valve and the fuel injection device, the exhaust gas purification method including: changing, in a case of performing control of throttling the throttle valve, an upper limit value of a valve openness when a fully closed condition of the throttle valve is set as a maximum value of the valve openness and a fully open condition of the throttle valve is set as a minimum of the valve openness, based on a determination result based on an accelerator openness of the accelerator and operation conditions of one or more operation devices different from the accelerator.

In addition, according to still another aspect of the present disclosure, there is provided a control device in an exhaust gas purification device including a throttle valve configured to be provided in a path through which an exhaust gas discharged from an engine flows, a rotational speed of the engine being controlled in accordance with an operation of an accelerator, a diesel oxidation catalyst device configured to be disposed on a downstream side of the throttle valve, a selective reduction catalyst device configured to be disposed on a downstream side of the diesel oxidation catalyst device, a fuel injection device configured to inject fuel on an upstream side of the diesel oxidation catalyst device, an inlet temperature sensor configured to measure an inlet temperature of the diesel oxidation catalyst device, and an outlet temperature sensor configured to measure an outlet temperature of the diesel oxidation catalyst device, in which the control device that inputs temperature data measured by the inlet temperature sensor and the outlet temperature sensor and controls the throttle valve and the fuel injection device, and, in a case of performing control of throttling the throttle valve, the control device changes an upper limit value of a valve openness when a fully closed condition of the throttle valve is set as a maximum value of the valve openness and a fully open condition of the throttle valve is set as a minimum of the valve openness, based on a determination result based on an accelerator openness of the accelerator and operation conditions of one or more operation devices different from the accelerator.

Advantageous Effects of Invention

According to the aspects of the present disclosure, it is possible to appropriately control the openness of an exhaust throttle valve.

BRIEF DESCRIPTION OF DRAWINGS

FIG. 5 A schematic diagram representing an example of each control condition in the temperature rising control.

FIG. 9 A schematic diagram representing an example of a vehicle safety state condition.

FIG. 10 A schematic diagram representing another example of the vehicle safety state condition.

FIG. 11 A schematic diagram representing still another example of the vehicle safety state condition.

FIG. 12 A schematic diagram representing an example of an ETV openness MAP1.

FIG. 13 A schematic diagram representing an example of an ETV openness MAP2.

DESCRIPTION OF EMBODIMENTS

Figure 1:
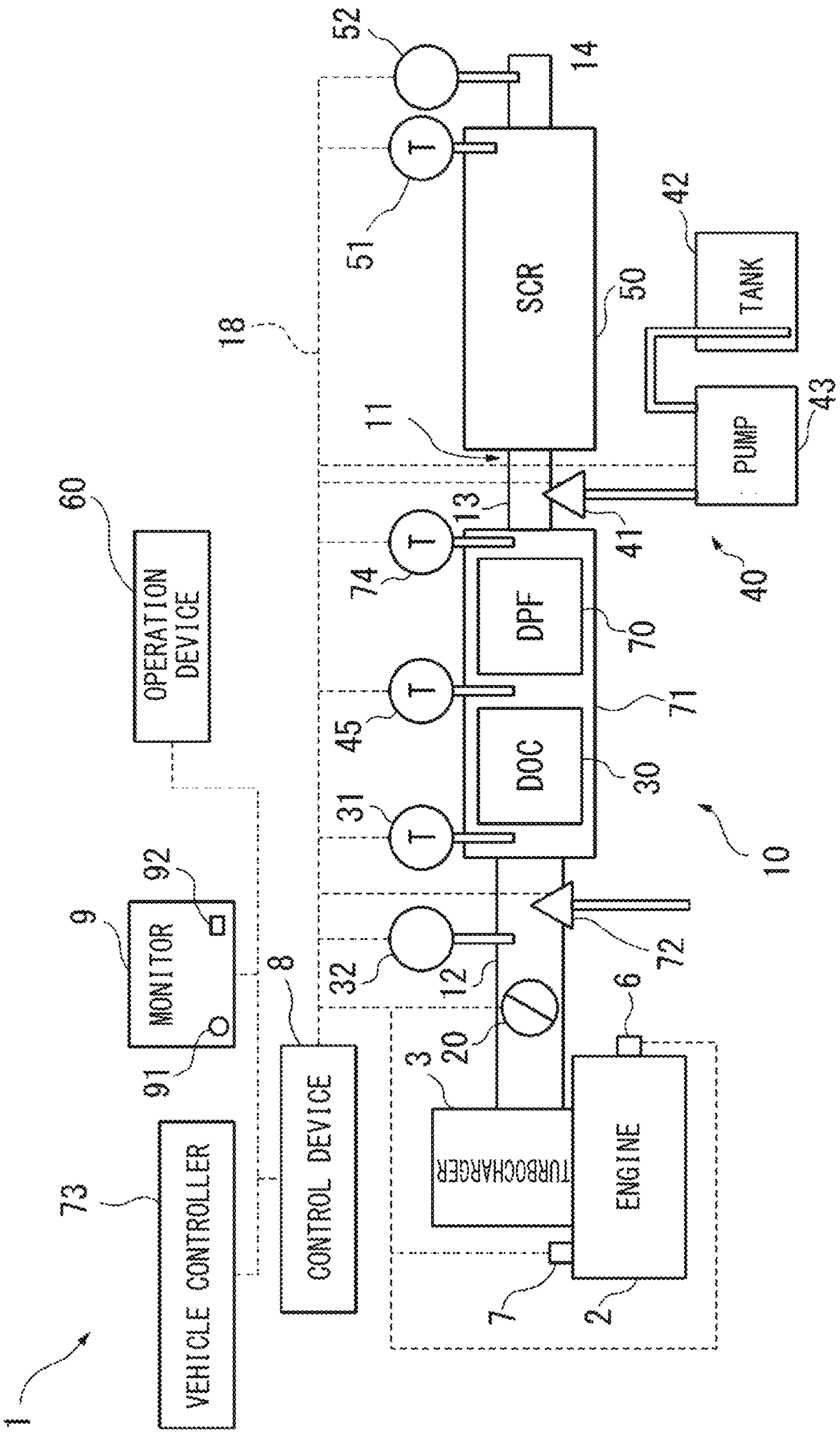
FIG. 1 A schematic configuration diagram of a work vehicle including an exhaust gas purification device according to an embodiment of the present disclosure.
Figure 2:
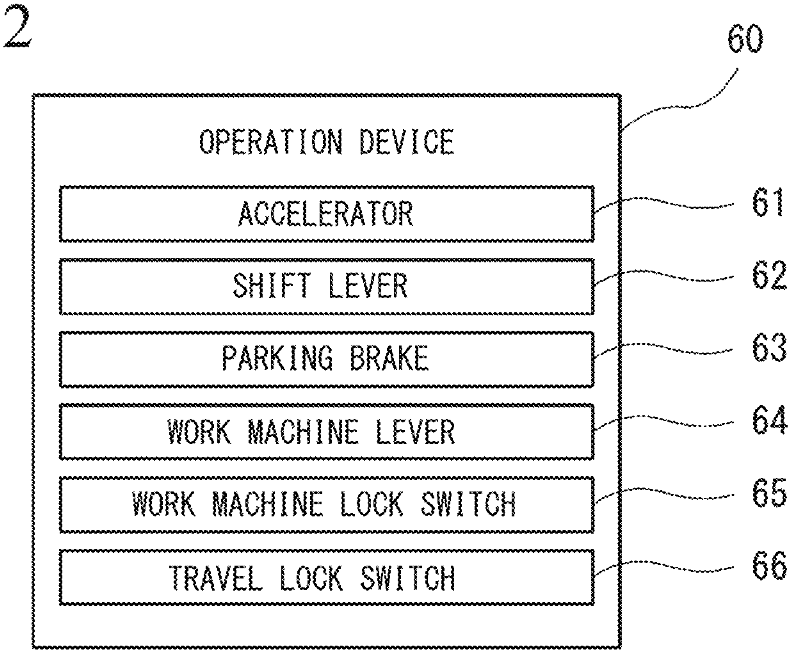
FIG. 2 A block diagram representing a configuration example of an operation device.
Figure 3:
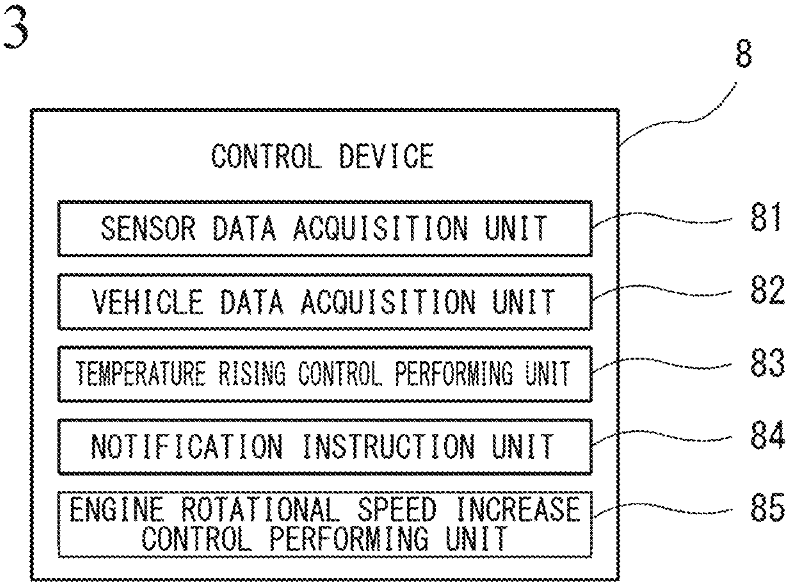
FIG. 3 A block diagram representing a configuration example of a control device.
Figure 4:
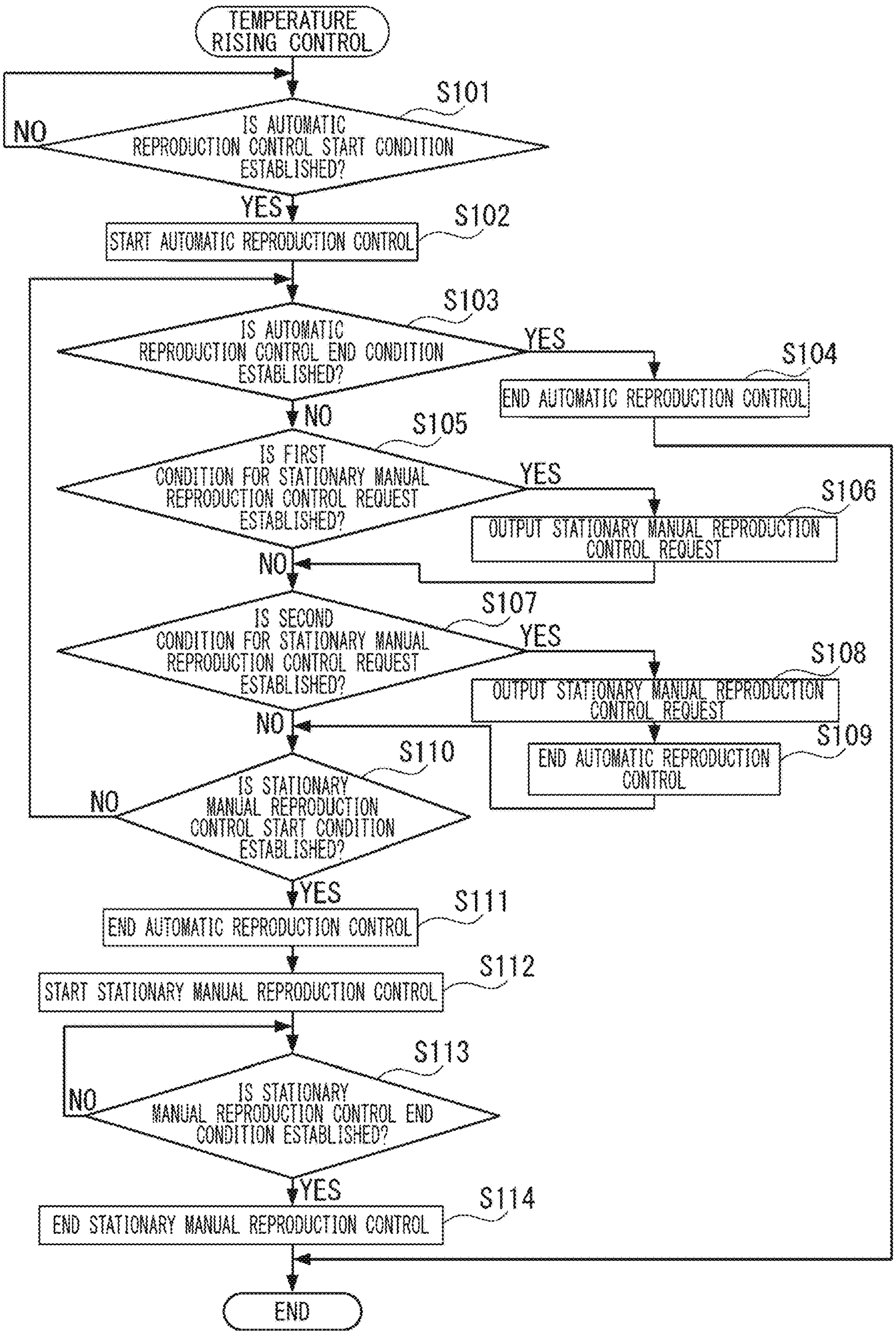
FIG. 4 A flowchart representing temperature rising control in the control device.
Figure 6:
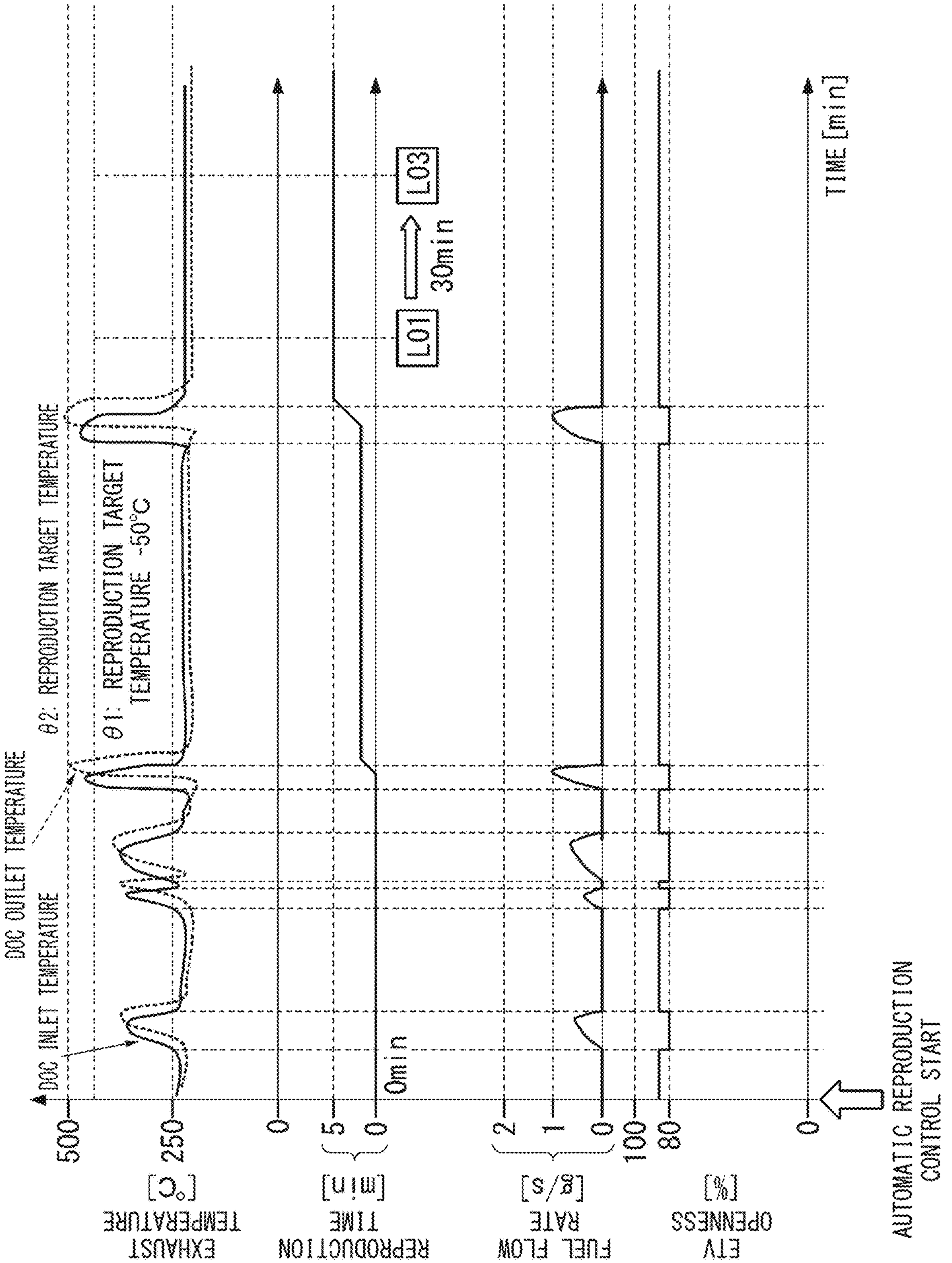
FIG. 6 A graph showing an operation example of the exhaust gas purification device.
Figure 7:
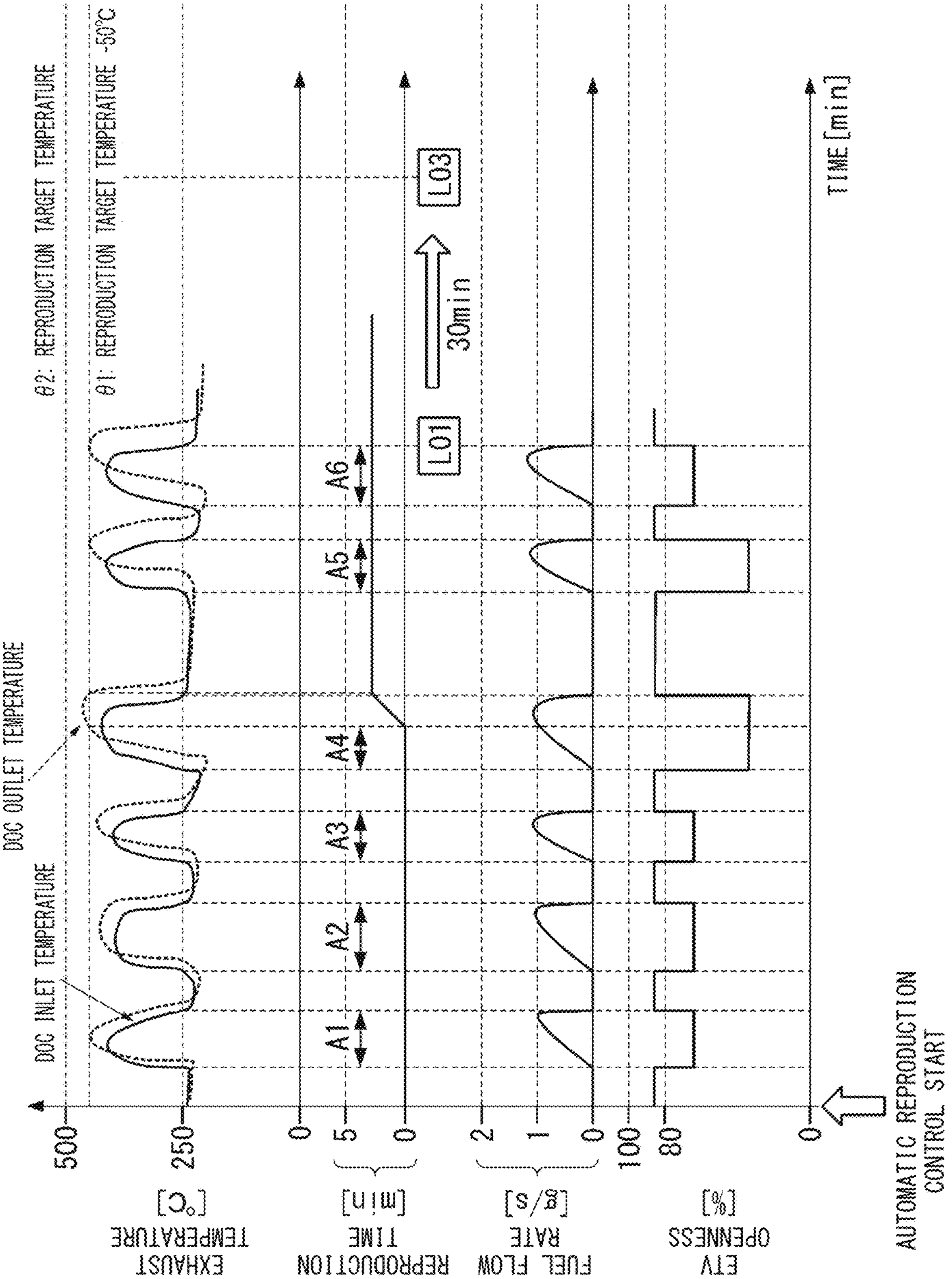
FIG. 7 A graph showing another operation example of the exhaust gas purification device.
Figure 8:
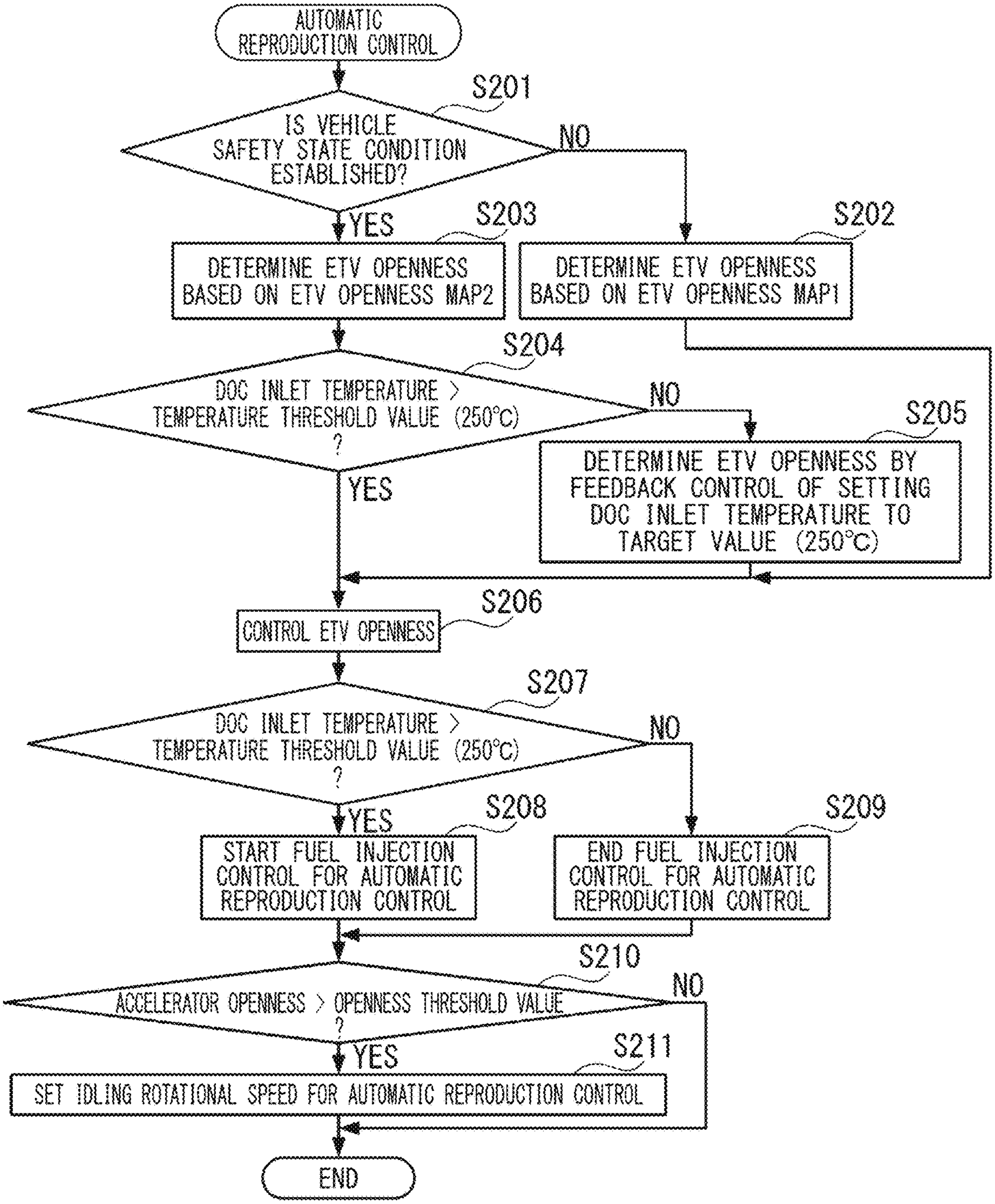
FIG. 8 A flowchart representing automatic reproduction control in the control device.
Figure 14:
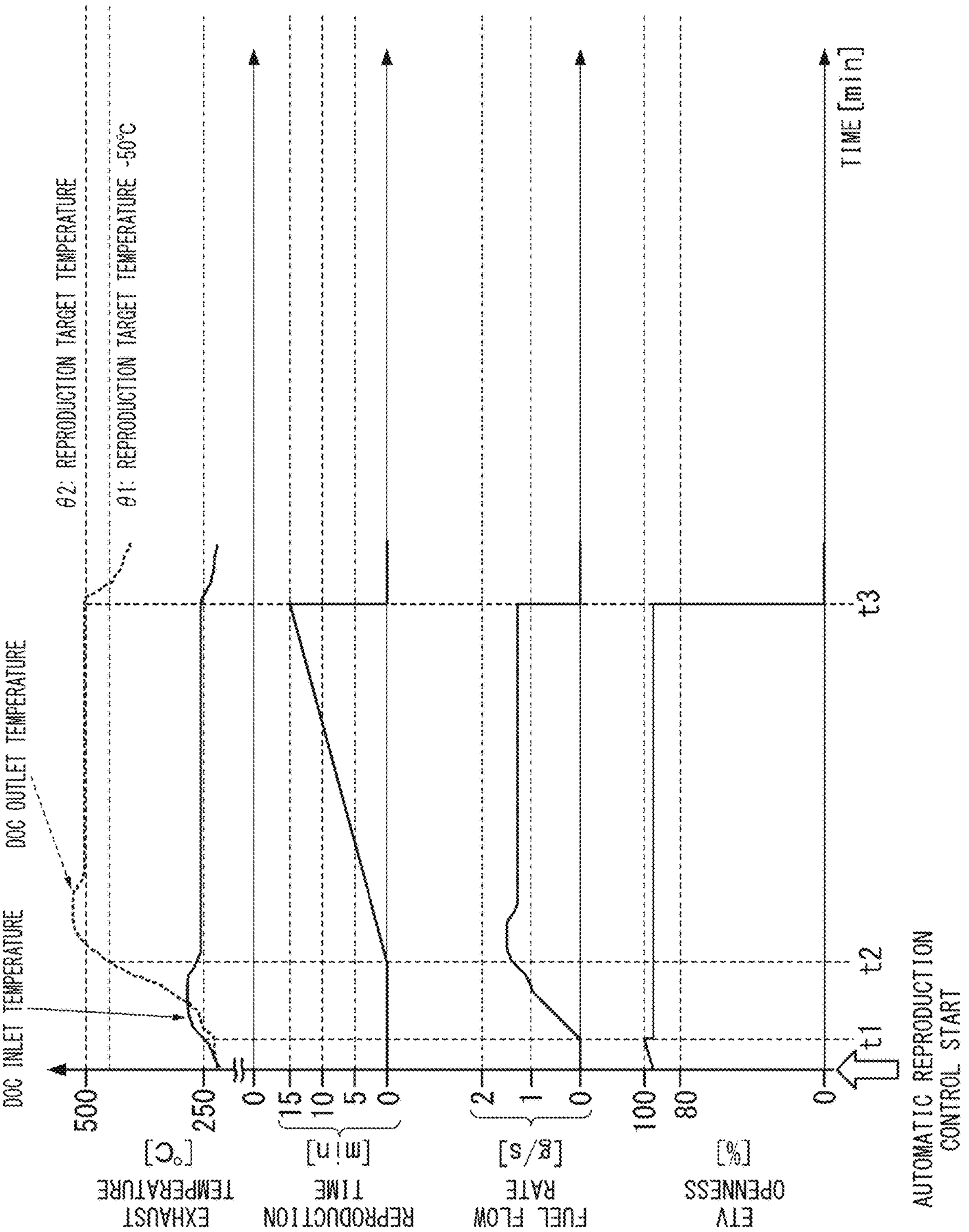
FIG. 14 A graph showing still another operation example of the exhaust gas purification device.

Embodiments of the present disclosure will be described below with reference to the drawings. FIG. 1 is a schematic configuration diagram of a work vehicle including an exhaust gas purification device according to an embodiment of the present disclosure. FIG. 2 is a block diagram representing a configuration example of an operation device. FIG. 3 is a block diagram representing a configuration example of a control device. FIG. 4 is a flowchart representing temperature rising control in the control device. FIG. 5 is a schematic diagram representing an example of each condition in the temperature rising control. FIGS. 6 and 7 are graphs showing operation examples of the exhaust gas purification device. FIG. 8 is a flowchart representing automatic reproduction control in the control device. FIGS. 9 to 11 are schematic diagrams representing examples of a vehicle safety state condition. FIG. 12 is a schematic diagram representing an example of an ETV openness MAP1. FIG. 13 is a schematic diagram representing an example of an ETV openness MAP2. FIG. 14 is a graph showing an operation example of the exhaust gas purification device. In each figure, the same reference signs are used for the same or corresponding configurations, and the description thereof will be omitted as appropriate.

[Schematic Configuration of Exhaust Gas Purification Device]

FIG. 1 schematically represents a schematic configuration of a work vehicle 1 including an exhaust gas purification device 10 according to the present embodiment. Here, the work vehicle 1 is, for example, a work machine that performs work such as excavation and leveling or transport of soil and the like in a construction site such as a mine or a road, and corresponds to, for example, construction machines such as a hydraulic shovel, a wheel loader, a bulldozer, a motor grader, and a crane, or transport vehicles such as a dump truck and a forklift. Since the exhaust gas purification device 10 in the present embodiment purifies an exhaust gas of a diesel engine, the exhaust gas purification device 10 can be used not only for the work vehicle 1 but also for various vehicles and devices including the diesel engine. The work vehicle 1 includes a diesel engine 2 (also referred to as an engine), a turbocharger 3 that rotates a turbine with the exhaust gas of the diesel engine 2 and compresses air to be supplied to the diesel engine 2, a control device 8, a monitor 9, a vehicle controller 73, an operation device 60, and the exhaust gas purification device 10.

The diesel engine 2 is provided with an engine rotational speed detection device 6 that detects an engine rotational speed and a fuel injection device 7 that injects fuel into the diesel engine 2. Detection data of the engine rotational speed detection device 6 is output to the control device 8. In addition, the control device 8 controls the fuel injection device 7 in accordance with an accelerator operation or the like.

[Monitor]

The monitor 9 includes a display unit and an input unit. The display unit is configured by a liquid crystal display or the like. The display unit displays various types of information such as a cooling water temperature and a remaining fuel level, caution, and the like. The monitor 9 in the present embodiment is provided with a notification unit 91 that performs a notification prompting performing of stationary manual reproduction, which will be described later. The monitor 9 functions as a notification device that notifies an operator of various types of information. The input unit is configured by a switch (button) or the like provided around the display unit. The functions of each input unit are displayed on the display unit by icons or the like. Therefore, the operator can easily ascertain which switch needs to be pressed in a case of performing the stationary manual reproduction. When a touch panel type monitor 9 is used, it is sufficient to touch a switch displayed on the touch panel. The monitor 9 in the present embodiment is provided with a switch (also referred to as a stationary manual reproduction switch) 92 for instructing performing of the stationary manual reproduction. The input unit is not limited to a switch provided integrally with the monitor 9, and may be configured by a switch installed in a housing or the like different from the monitor 9.

[Exhaust Gas Purification Device]

The exhaust gas purification device 10 performs a process of collecting or reducing a residual substance such as a particulate matter (abbreviated as "PM" below) or nitrogen oxide (NOx) in the exhaust gas, and is controlled by the control device 8. The exhaust gas purification device 10 includes, in order from an upstream side in a flow direction of the exhaust gas discharged from the diesel engine 2, an exhaust throttle valve (also referred to as a "throttle valve" or an "ETV" below) 20, a fuel injection device 72, a DPF device 71, a urea water injection system 40, and a selective catalytic reduction (referred to as SCR below) device 50. The DPF device 71 includes a diesel oxidation catalyst (abbreviated as "DOC" below) device 30 and a diesel particulate filter (DPF) 70. The DPF device 71, the urea water injection system 40, and the SCR device 50 are provided in the middle of a path 11 through which the exhaust gas from the diesel engine 2 flows. The path 11 includes an inlet pipe 12 that introduces an exhaust gas from the turbocharger 3 connected to the diesel engine 2 into the DPF device 71, an outlet pipe 13 that connects the DPF device 71 and the SCR device 50, and an outlet pipe 14 that is connected to the outlet of the SCR device 50. In addition, in the outlet pipe 13, a mechanism for diffusing urea water supplied from the urea water injection system 40 is provided.

[Throttle Valve]

The throttle valve 20 is configured by a butterfly valve or the like disposed in the inlet pipe 12. The valve openness of the throttle valve 20 is controlled by the control device 8, and the temperature of the exhaust gas is adjusted by adjusting the valve openness as described later. That is, when the valve openness is decreased, the exhaust gas is compressed in front of the throttle valve 20, and the pressure and temperature of the exhaust gas flowing through an exhaust flow passage are increased. At this time, for example, the control device 8 sets a torque target value of the engine based on an accelerator openness or the like, and controls the valve openness of the throttle valve 20 by using map (also referred to as "MAP") data in which the valve openness is set by using the set torque target value and the engine rotational speed as elements. However, the map data may be, for example, map data in which the valve openness is set by using a fuel injection amount and the engine rotational speed as elements. Specifically, in a case where the torque is small, that is, the load of the engine is small, the temperature of the exhaust gas is also reduced. In addition, even in a case where the engine rotational speed is low, the temperature of the exhaust gas is reduced. Here, in a case where the fully closed condition is set to 100% and the fully open condition is set to 0% as the valve openness of the throttle valve 20, in a region where the torque is equal to or less than a predetermined value, the valve openness of the throttle valve 20 is set to increase as the torque becomes smaller and to decrease as the torque becomes larger, and is set to increase as the engine rotational speed becomes smaller and to decrease as the engine rotational speed becomes larger. For example, in a case where the torque is small and the engine rotational speed is small, the valve openness only needs to be set to about 90%. In a case where the torque is large and the engine rotational speed is large, the valve openness only needs to be set to be small (for example, about 60%). As a result, in a state where the load of the engine is low, that is, in a state where the temperature has difficulty in rising, the valve is closed (the valve openness is increased) to increase the pressure resistance of the exhaust gas and to raise the temperature of the exhaust gas. Since the throttle valve 20 has a gap in the structure even in a case where the valve openness is 100%, the inlet pipe 12 is not completely closed.

[DPF Device]

The DPF device 71 includes the DOC device 30 and the DPF 70, collects PMs in the DPF 70, oxidizes the PMs collected downstream by nitrogen dioxide converted by the DOC device 30 to make carbon dioxide, thereby removing the PMs.

[DOC Device]

The DOC device 30 includes a case, and a diesel oxidation catalyst is accommodated in the case. The DOC device 30 is a catalyst that oxidizes fuel supplied if necessary into an exhaust gas (referred to as dosing fuel below, and supply of the dosing fuel is referred to as fuel dosing below) and generates heat to increase an exhaust gas temperature to a predetermined high temperature range. By using the exhaust gas having an increased temperature, for example, urea deposits accumulated in the outlet pipe 13 or the like, which will be described later, are decomposed and removed to be reproduced. The dosing fuel is, for example, the same light oil as the engine fuel. In a case where the dosing fuel is supplied into an engine cylinder, the dosing fuel is supplied by post-injection with the fuel injection device 7 for in-engine cylinder injection. In addition, in the present embodiment, the fuel can be supplied into the exhaust gas by the fuel injection device 72 for dosing, which is provided in the inlet pipe 12, and can be caused to flow into the DOC device 30 together with the exhaust gas. The fuel injection device according to the present disclosure corresponds to at least one of the fuel injection device 7 or the fuel injection device 72.

[Urea Water Injection System]

The urea water injection system 40 adds a urea aqueous solution as a reducing-agent aqueous solution to the exhaust gas. The urea water injection system 40 includes an injection nozzle 41 that is attached to the outlet pipe 13 of the DPF device 71 and injects a urea aqueous solution inside the outlet pipe 13, a urea water tank 42 that stores the urea aqueous solution, and a pump unit 43 that supplies the urea aqueous solution from the urea water tank 42 to the injection nozzle 41. The control device 8 controls the injection nozzle 41 and the pump unit 43 to inject the urea aqueous solution from the injection nozzle 41 into the outlet pipe 13. The urea aqueous solution injected into the outlet pipe 13 is hydrolyzed by heat of the exhaust gas and becomes ammonia.

[SCR Device]

The SCR device 50 reduces and purifies nitrogen oxides in the exhaust gas by using, as a reducing agent, ammonia obtained by hydrolyzing a urea aqueous solution. Ammonia is supplied to the SCR device 50 together with the exhaust gas as the reducing agent. An ammonia oxidation catalyst may be provided on the downstream side of the SCR device 50. The ammonia oxidation catalyst oxidizes and detoxifies ammonia that is not used in the SCR device 50, and further reduces the emission of the exhaust gas. When the urea aqueous solution is injected from the injection nozzle 41, urea may be crystallized and precipitated in the outlet pipe 13. Therefore, it is necessary to perform a reproduction process of decomposing the precipitate (urea deposit) in the outlet pipe 13 by raising the exhaust gas temperature. The reproduction process includes automatic reproduction control that is automatically performed when the work vehicle is in operation and stationary manual reproduction that is performed by a manual operation of the operator. The reproduction process is switched, selected, and controlled by the control device 8.

[Sensor]

The exhaust gas purification device 10 is provided with various sensors for detecting the status of the diesel engine 2 or the exhaust gas purification device 10. That is, in the inlet pipe 12, a NOx sensor 32 that detects the concentration of nitrogen oxides (NOx) contained in the exhaust gas is disposed on the downstream side of the throttle valve 20. The DPF device 71 is provided with an inlet temperature sensor 31 that measures an inlet temperature of the DOC device 30, an outlet temperature sensor 45 that measures an outlet temperature of the DOC device 30, and an outlet temperature sensor 74 that measures an outlet temperature of the DPF 70. The SCR device 50 is provided with an SCR outlet temperature sensor 51 that measures an outlet temperature of the SCR device 50. A NOx sensor 52 that detects the concentration of nitrogen oxides contained in the exhaust gas discharged from the SCR device 50 is disposed in the outlet pipe 14 connected to the SCR device 50. These sensors are connected to the control device 8 via a Controller Area Network (CAN) 18, and output measurement data to the control device 8. The NOx sensor 32 may be installed at a position of the DPF outlet. In addition, a temperature sensor may be installed at the SCR inlet. In addition, examples of other sensors include a differential pressure sensor installed before and after the DPF 70.

The control device 8 measures the temperature of the exhaust gas on the inlet side of the DOC device 30 with the inlet temperature sensor 31, and controls the valve openness of the throttle valve 20 in accordance with the measured temperature to adjust the temperature of the exhaust gas. The control device 8 acquires the engine rotational speed Ne from the engine rotational speed detection device 6, acquires the temperature Tatin of the exhaust gas on the inlet side of the DOC device 30 from the inlet temperature sensor 31, and acquires the nitrogen oxide concentration NOxin on the inlet side of the DOC device 30 from the NOx sensor 32. In addition, the control device 8 acquires the temperature Tatout of the exhaust gas on the outlet side of the DOC device 30 from the outlet temperature sensor 45, acquires the SCR outlet temperature from the SCR outlet temperature sensor 51, and acquires the nitrogen oxide concentration NOxout on the outlet side of the SCR device 50 from the NOx sensor 52. The control device 8 controls the operations of the fuel injection device 7, the fuel injection device 72, the throttle valve 20, the injection nozzle 41, and the pump unit 43 based on the acquired pieces of data and information such as an accelerator operation by the operator.

[Operation Device]

As represented in FIG. 2, the operation device 60 includes various operation devices operated by the operator, such as an accelerator 61, a shift lever 62, a parking brake 63, a work machine lever 64, a work machine lock switch 65, and a travel lock switch 66. In addition, the operation device 60 includes a brake, a steering, and the like. However, some of the operation devices represented in FIG. 2 may be omitted depending on the specifications of the work vehicle 1. The accelerator 61 is a device that operates the rotational speed (or acceleration degree) of the engine 2, and has a form of an accelerator pedal, an accelerator lever, or the like. In the present embodiment, the operation amount of the accelerator 61 is referred to as an accelerator openness. In the present embodiment, the accelerator openness of 0% corresponds to a case where the operation amount is zero. The shift lever 62 is a device that operates a speed stage of a transmission. The shift lever 62 sets the transmission to, for example, neutral (also abbreviated as "N" below), forward, reverse, or the like. The parking brake 63 is an operation device that switches a parking brake provided in the work vehicle 1 between an operation condition and a non-operation condition. The work machine lever 64 is a device that operates a work machine provided in the work vehicle 1. The work machine lever 64 includes a mechanism that automatically returns to a neutral position in a case where the operator releases the hand, and outputs a signal corresponding to a forward/backward or forward/backward/left/right tilt amount from the neutral position of the lever. The operations of the various actuators are controlled by the vehicle controller 73 (or a work machine controller (not represented)) in accordance with the signal. In a case where the work machine lock switch 65 is operated in a locked state, the operation of the work machine is stopped. In a case where the travel lock switch 66 is operated in a locked state, a travel device of the work vehicle 1 is stopped.

[Vehicle Controller]

The vehicle controller 73 controls each unit of the work vehicle 1 by inputting a signal representing an operation condition (an on state, an off state, an operation amount, and the like) of each operation device from the operation device 60 or transmitting and receiving predetermined data to and from another controller (not represented) such as the control device 8. In the present embodiment, the vehicle controller 73 transmits data indicating the operation conditions of the accelerator 61, the shift lever 62, the parking brake 63, the work machine lever 64, the work machine lock switch 65, the travel lock switch 66, and the like, a determination result of a vehicle safety state condition which will be described later, and the like (these pieces of data are collectively referred to as "vehicle data" below) to the control device 8.

[Control Device]

Next, a configuration of the control device 8 will be described. As represented in FIG. 3, the control device 8 includes a sensor data acquisition unit 81, a vehicle data acquisition unit 82, a temperature rising control performing unit 83, a notification instruction unit 84, and an engine rotational speed increase control performing unit 85.

[Sensor Data Acquisition Unit]

The sensor data acquisition unit 81 repeatedly acquires measurement data of each sensor such as the engine rotational speed detection device 6, the NOx sensor 32, the inlet temperature sensor 31, the outlet temperature sensor 45, and the NOx sensor 52 at a predetermined cycle.

[Vehicle Data Acquisition Unit]

The vehicle data acquisition unit 82 repeatedly acquires the above-described vehicle data from the vehicle controller 73 at a predetermined cycle.

[Temperature Rising Control Performing Unit]

The temperature rising control performing unit 83 performs control (referred to as temperature rising control) of raising the temperature of the exhaust gas when the exhaust gas purification device 10 is reproduced. In the temperature rising control, the temperature rising control performing unit 83 controls the valve openness of the throttle valve 20, and, for example, controls the fuel injection device 72 to supply the dosing fuel when the inlet temperature Tatin measured by the inlet temperature sensor 31 is equal to or higher than a set temperature (for example, 250° C.). The set temperature is a temperature at which the DOC device 30 can be activated. The dosing fuel is supplied to the DOC device 30 together with the exhaust gas, and generates heat by a chemical reaction with the oxidation catalyst of the DOC device 30. Therefore, the temperature of the exhaust gas increased by the control of the valve openness of the throttle valve 20 further increases when the exhaust gas flows through the DOC device 30. That is, the outlet temperature Tatout of the exhaust gas measured by the outlet temperature sensor 45 is higher than the inlet temperature Tatin.

In addition, in the present embodiment, the temperature rising control includes automatic reproduction control and stationary manual reproduction control. The automatic reproduction control is control of automatically performing the temperature rising control in a case where the temperature rising control performing unit 83 determines that the reproduction is necessary. The stationary manual reproduction control is control of performing the temperature rising control by stopping the normal operation of the work vehicle 1 under the permission of the operator, for example, in a case where the automatic reproduction control is not completed within a predetermined time. In the stationary manual reproduction control, the control device 8 (notification instruction unit 84) first outputs, to the operator, a request for making a state where the stationary manual reproduction can be performed and a request for performing the stationary manual reproduction, by using the monitor 9. On the other hand, when the operator issues an instruction to perform the stationary manual reproduction by using the monitor 9, the control device 8 fixes the engine rotational speed to a certain rotational speed, increases the exhaust temperature, and removes PMs or urea deposits accumulated in the DPF or the SCR and releases HC, sulfur, or the like adsorbed to the DPF or the SCR. In the present embodiment, the operation of the work vehicle 1 in a state where the temperature rising control is being performed is referred to as a reproduction operation. In addition, a specific example of the temperature rising control will be described later.

[Notification Instruction Unit]

In a case where the temperature rising control performing unit 83 determines that the stationary manual reproduction control needs to be performed, during the performing of the automatic reproduction control, the notification instruction unit 84 outputs the determination result from the monitor 9 to notify the operator. The monitor 9 notifies the operator that the stationary manual reproduction control needs to be performed by blinking the notification unit 91 or sounding a buzzer or the like. By the notification from the monitor 9, the operator can ascertain that the completion of the reproduction process by the automatic reproduction temperature rising control is difficult and the stationary manual reproduction needs to be performed. Thus, when the operator presses the switch 92 of the monitor 9 to instruct the performing of the stationary manual reproduction in response to the notification of the monitor 9, the stationary manual reproduction is performed by the temperature rising control performing unit 83.

In addition, in a case where the operator does not issue an instruction to perform the stationary manual reproduction within a fourth determination time T14 (for example, 30 minutes) after the first notification (referred to as a stationary manual reproduction control request L01 below), the notification instruction unit 84 outputs a stationary manual reproduction control request L03 which is a second notification. In the stationary manual reproduction control request L03, the monitor 9 performs a notification for prompting the operator to perform the stationary manual reproduction again by increasing the blinking speed of the notification unit 91 or increasing the sound volume of a report sound such as the buzzer.

[Engine Rotational Speed Increase Control Performing Unit]

In a case where the accelerator openness exceeds a predetermined openness threshold value after the start of the automatic reproduction control, the engine rotational speed increase control performing unit 85 performs control of increasing the target value of an idling rotational speed of the engine 2 from a normal rotational speed (for example, 600 to 700 rpm) to a predetermined value (for example, 1000 rpm). The automatic reproduction control is control automatically started by the control device 8. Thus, when the timing of increasing setting of the idling rotational speed is matched with the start timing of the automatic reproduction control, there is a possibility that the operator feels uncomfortable. Regarding this, the operator can reduce the sense of discomfort by increasing the setting of the idle rotational speed in accordance with the timing at which the operator operates the accelerator 61.

[Temperature Rising Control]

Next, the temperature rising control in the present embodiment will be described with reference to FIGS. 4 to 7. FIG. 4 represents an overall flow of the temperature rising control. After the work vehicle 1 is started, the control device 8 (temperature rising control performing unit 83) repeatedly determines whether or not a start condition of the automatic reproduction control is established at a predetermined cycle (Step S101).

As represented in FIG. 5, the automatic reproduction control start condition is established in a case where the elapsed time from the end of the previous reproduction operation reaches a first setting time T1, in a case where the denitrification efficiency calculated from the measurement data of the NOx sensors 32 and 52 is equal to or less than a threshold value, or the like. Here, the first setting time T1 only needs to be set in consideration of the estimated accumulation amount of the urea deposit, the poisoning by HC or sulfur adsorbed to the DPF or the SCR, and the like in association with the long-time operation. The estimated accumulation amount of the urea deposit will be described below as an example. For example, the accumulation amount of the urea deposit per hour varies depending on the type of the work vehicle 1 or the diesel engine 2, the work content (operation status), and the like, but can be estimated by experiments or simulations. In addition, the accumulation amount of the urea deposit is also influenced by the completion time of the temperature rising control. Thus, the first setting time T1 only needs to be set in consideration of these factors. For example, in a case where setting of desiring the automatic reproduction control to be completed in 15 minutes is made, and the time until the accumulation amount of the urea deposit that can be removed in that time is reached varies depending on the type of the work vehicle, for example, 24 hours, 48 hours, 72 hours, 96 hours, and 120 hours, the first setting time T1 only needs to be set to 24 hours, 48 hours, 72 hours, 96 hours, 120 hours, and the like depending on the type of the work vehicle. In many work vehicles, the first setting time T1 is set in a range of about 24 to 120 hours. In addition, the denitrification efficiency is obtained by (NOxin-NOxout)/NOxin×100 using the nitrogen oxide concentration NOxin measured by the NOx sensor 32 and the nitrogen oxide concentration NOxout measured by the NOx sensor 52. In this case, the automatic reproduction control is performed in a case where the denitrification efficiency is in a state of being equal to or less than the threshold value even before the first set time T1 elapses. In addition, regardless of the automatic reproduction based on the denitrification efficiency, the automatic reproduction control can be always performed for each first setting time T1, and, in a case where the automatic reproduction based on the denitrification efficiency is started, the first setting time T1 can be reset.

In a case where the automatic reproduction control start condition is established (Step S101: Yes), the temperature rising control performing unit 83 starts the automatic reproduction control (Step S102). Details of the automatic reproduction control will be described later. Then, the temperature rising control performing unit 83 determines whether or not the end condition of the automatic reproduction control is established (Step S103). In a case where the automatic reproduction control end condition is established (Step S103: Yes), the temperature rising control performing unit 83 ends the automatic reproduction control (Step S104) and ends the temperature rising control.

As represented in FIG. 5, the automatic reproduction control end condition is established in a case where a time when the DOC outlet temperature Tatout measured by the outlet temperature sensor 45 is equal to or higher than a reproduction determination temperature θ1 (for example, 450° C.) is integrated as a first integration time (reproduction time) and the first integration time is equal to or longer than a first determination time T11 (for example, 15 minutes). The reproduction determination temperature θ1 is set based on a reproduction target temperature θ2. The reproduction target temperature θ2 is a target value of the outlet temperature Tatout set in order to recover the performance deterioration due to the removal of the urea deposit, the poisoning by HC or sulfur adsorbed to the DPF or the SCR, and the like, in association with the long-time operation. The estimated accumulation amount of the urea deposit will be described below as an example. Then, the control device 8 mainly increases the supply amount of the dosing fuel to increase the outlet temperature Tatout when the outlet temperature Tatout is lower than the reproduction target temperature θ2, and the control device 8 mainly decreases the supply amount of the dosing fuel to decrease the outlet temperature Tatout when the outlet temperature Tatout is higher than the reproduction target temperature θ2. Thus, during the reproduction process for removing the urea deposit, the outlet temperature Tatout moves up and down near the reproduction target temperature θ2. Then, since it is determined that the reproduction process for moving the outlet temperature Tatout up and down near the reproduction target temperature θ2 is in progress, the reproduction determination temperature θ1 lower than the reproduction target temperature θ2 by a predetermined temperature is set. In the present embodiment, since the reproduction target temperature θ2 is set to 500° C. as an example and the predetermined temperature is set to −50° C., the reproduction determination temperature θ1 is set to 450° C. The reproduction determination temperature θ1 is set not to fall below the lower limit value of the temperature range in which the urea deposit can be removed.

The first determination time T11 is set in accordance with the first setting time T1. The first determination time T11 is a time required to remove the urea deposit by the temperature rising control. Therefore, the first determination time T11 depends on the accumulation amount of the urea deposit. The accumulation amount of the urea deposit is influenced by a time interval at which the temperature rising control is performed, that is, the first setting time T1. Thus, the first determination time T11 may be set in accordance with the first setting time T1. In the present embodiment, since the first setting time T1 is 48 hours as an example, the first determination time T11 is set to 15 minutes. When the first setting time T1 is longer than 48 hours, it is preferable that the first determination time T11 is also set to be longer. When the first setting time T1 is shorter than 48 hours, the first determination time T11 can also be set to be shorter. Thus, the first determination time T11 only needs to be set in a range of, for example, about 10 minutes to 60 minutes in accordance with the first setting time T1.

In a case where the automatic reproduction control end condition is not established (Step S103: No), the temperature rising control performing unit 83 determines whether or not a first condition for the stationary manual reproduction control request is established (Step S105).

As represented in FIG. 5, the first condition for the stationary manual reproduction control request is established in a case where the first integration time (reproduction time) obtained by integrating a time during which the measured temperature (outlet temperature Tatout) of the outlet temperature sensor 45 is equal to or higher than the reproduction determination temperature θ1 is shorter than the first determination time T11 and the elapsed time from the start of the reproduction process is equal to or longer than the second determination time T12 (for example, 120 minutes) during the performing of the automatic reproduction control. When the first condition for the stationary manual reproduction control request is established, the temperature rising control performing unit 83 determines that the condition for notifying the operator that the stationary manual reproduction needs to be performed is satisfied. The first condition for the stationary manual reproduction control request is not limited to this example. For example, a case where the PM accumulation amount in the DPF is estimated from a differential pressure sensor value before and after the DPF, which is not represented, and the estimated value is equal to or more than a predetermined threshold value can be included in the first condition for the stationary manual reproduction control request as an OR condition.

As described above, the first determination time T11 is a time at which the automatic reproduction control is completed. The second determination time T12 is set to a time for which the continuation of the work by the work vehicle 1 is permitted while the automatic reproduction control is performed. When the second determination time T12 elapses in a state where the automatic reproduction control is not completed, a notification for prompting the performing of the stationary manual reproduction is performed. During the stationary manual reproduction, it is not possible to continue the work by the work vehicle 1. Therefore, the second determination time T12 is set as a grace time during which the operator can continue the work until the notification. Thus, in a case where the grace time may be set to be shorter, the second determination time T12 may be set to be shorter, for example, about 60 minutes to 90 minutes. In addition, in a case where it is desired to set the grace time to be longer, the second determination time T12 may be set to be longer, for example, about 150 minutes to 180 minutes.

For example, as represented in FIG. 6, in a state where the automatic reproduction control is performed, in a case where the load of the diesel engine 2 is low and the outside air temperature is under a low temperature environment (for example, −25° C. or lower), for example, in a case where the diesel engine 2 is stopped in an idling state, the temperature of the exhaust gas may be low, and the inlet temperature Tatin measured by the inlet temperature sensor 31 may be equal to or lower than the set temperature (250° C.). Therefore, the supply of the dosing fuel, which is performed only in a case where the inlet temperature Tatin is equal to or higher than the set temperature, is hardly performed, and the reproduction time during which the outlet temperature Tatout measured by the outlet temperature sensor 45 is equal to or higher than the reproduction determination temperature θ1 is also shortened. FIG. 6 represents an example of a change in time of the DOC inlet temperature Tatin, the DOC outlet temperature Tatout, the reproduction time, the dosing fuel flow rate, and the valve openness of the throttle valve 20, with a horizontal axis as a time axis.

In a case where the first condition for the stationary manual reproduction control request is established (Step S105: Yes), the notification instruction unit 84 outputs the stationary manual reproduction control request (Step S106). In Step S106, first, the notification instruction unit 84 outputs the stationary manual reproduction control request L01, and then, in a case where the operator does not issue the instruction to perform the stationary manual reproduction within the fourth determination time T14 (for example, 30 minutes), the notification instruction unit 84 outputs the stationary manual reproduction control request L03.

In a case where the first condition for the stationary manual reproduction control request is not established (Step S105: No) or after the notification instruction unit 84 outputs the stationary manual reproduction control request (Step S106), the temperature rising control performing unit 83 determines whether or not a second condition for the stationary manual reproduction control request is established (Step S107).

As represented in FIG. 5, the second condition for the stationary manual reproduction control request is that, during the performing of the automatic reproduction control, the second integration time obtained by integrating the time during which the measured temperature (outlet temperature Tatout) of the outlet temperature sensor 45 is lower than the reproduction determination temperature θ1 is equal to or longer than the third determination time T13 (for example, 60 minutes) while the reproduction time is lower than the first determination time T11 (15 minutes) and the dosing fuel is supplied (that is, while the inlet temperature Tatin is equal to or higher than the set temperature (250° C.)). Even in a case where the second condition for the stationary manual reproduction control request is satisfied, the temperature rising control performing unit 83 determines that the performing condition of the stationary manual reproduction is satisfied.

The third determination time T13 is set as the grace time for continuing a state where the temperature of the exhaust gas does not increase even though the dosing fuel is supplied and the reproduction process does not normally operate. A case corresponding to the second condition for the stationary manual reproduction control request is a case where there is a possibility that the DOC device 30 does not normally operate or a case where there is a possibility that the operator performs a special operation of repeatedly operating and stopping the work machine in a short time. Therefore, it is preferable to determine that the second condition for the stationary manual reproduction control request is satisfied in a time shorter than the second determination time T12 of the first condition for the stationary manual reproduction control request. Thus, the third determination time T13 is set to a time shorter than the second determination time T12, specifically, half the time. The time of the third determination time T13 may also be adjusted in accordance with the second determination time T12. For example, in a case where the second determination time T12 is set to 90 minutes, the third determination time T13 may be set to about 40 minutes to 60 minutes. In a case where the second determination time T12 is set to 150 minutes, the third determination time T13 may be set to about 60 minutes to 80 minutes.

For example, as represented in FIG. 7, in a state where the automatic reproduction control is performed, depending on how the work vehicle 1 is used, the measured temperature (outlet temperature Tatout) of the outlet temperature sensor 45 may not rise up to the reproduction determination temperature θ1 or higher even though the dosing fuel is being supplied, and the second integration time obtained by integrating the time for which the outlet temperature Tatout is lower than the reproduction determination temperature θ1 may be equal to or longer than the third determination time T13. The second integration time is obtained by integrating all times of the arrows A1 to A6 in FIG. 7. In FIG. 7, the first integration time (reproduction time) is the reproduction time in which the outlet temperature Tatout is equal to or higher than the reproduction determination temperature θ1, as in the first condition for the stationary manual reproduction control request. In a case where the second condition for the stationary manual reproduction control request is satisfied, a state where the automatic reproduction control end condition is not satisfied continues even though the dosing fuel is supplied. Thus, it can be determined that the stationary manual reproduction needs to be performed earlier than the first condition for the stationary manual reproduction control request. FIG. 7 represents an example of a change in time of the DOC inlet temperature Tatin, the DOC outlet temperature Tatout, the reproduction time, the dosing fuel flow rate, and the valve openness of the throttle valve 20, with a horizontal axis as a time axis.

In a case where the second condition for the stationary manual reproduction control request is established (Step S107: Yes), the notification instruction unit 84 outputs the stationary manual reproduction control request (Step S108). In Step S108, first, the notification instruction unit 84 outputs the stationary manual reproduction control request L01, and then, in a case where the operator does not issue the instruction to perform the stationary manual reproduction within the fourth determination time T14 (for example, 30 minutes), the notification instruction unit 84 outputs the stationary manual reproduction control request L03. Then, the temperature rising control performing unit 83 ends the automatic reproduction control (Step S109).

In a case where it is determined that the first condition for the stationary manual reproduction control request is satisfied (Step S105: Yes), the temperature rising control performing unit 83 continues the performing of the automatic reproduction control. Therefore, the automatic reproduction control process continues even after the notification by the notification instruction unit 84. Then, in a case where the reproduction time reaches the first determination time T11 (15 minutes) and the reproduction process in the automatic reproduction control is completed before the performing of the stationary manual reproduction is started (Step S103: Yes), the notification instruction unit 84 stops the output of the stationary manual reproduction control request L01 or L03 in Step S104 and ends the notification on the monitor 9. On the other hand, in a case where it is determined that the second condition for the stationary manual reproduction control request is satisfied (Step S107: Yes), the temperature rising control performing unit 83 stops the performing of the automatic reproduction control (Step S109). Therefore, the notification by the notification instruction unit 84 continues until the operator does not operate the performing of the stationary manual reproduction.

In a case where the second condition for the stationary manual reproduction control request is not established (Step S107: No) or after the temperature rising control performing unit 83 ends the performing of the automatic reproduction control (Step S109), the temperature rising control performing unit 83 determines whether or not the stationary manual reproduction control start condition is established (Step S110).

As represented in FIG. 5, the stationary manual reproduction control start condition is established in a case where the stationary manual reproduction switch 92 is pressed by the operator and the work vehicle is in a state where the stationary manual reproduction can be performed. Here, the state where the stationary manual reproduction can be performed is, for example, a state where the work vehicle is stopped and not operated, such as a state where the parking brake is operated, the accelerator is in an off state, and the work machine lever is in a neutral position.

In a case where the stationary manual reproduction control start condition is established (Step S110: Yes), the temperature rising control performing unit 83 ends the automatic reproduction control (Step S111) and starts the stationary manual control (Step S112). In a case where the automatic reproduction control is ended in Step S109, the temperature rising control performing unit 83 does nothing in Step S111. Then, it is determined whether or not the stationary manual reproduction control end condition is established (Step S113). In a case where the stationary manual reproduction control end condition is established (Step S113: Yes), the temperature rising control performing unit 83 ends the stationary manual reproduction control (Step S114) and ends the temperature rising control.

The temperature rising control performing unit 83 performs the stationary manual reproduction control in a manner as follows, for example. That is, the temperature rising control performing unit 83 acquires the setting valve openness ETVffo specified by the engine rotational speed Ne and the target torque (or the fuel injection amount Qf) from the map for the stationary manual reproduction, and performs control such that the valve openness of the throttle valve 20 becomes the setting valve openness ETVffo. In the stationary manual reproduction, the valve openness of the throttle valve 20 and the supply amount of the dosing fuel are controlled so that the temperature of the exhaust gas is likely to be higher than in the automatic reproduction control, and thus, it is possible to efficiently recover the performance deterioration of the DPF or the SCR. The stationary manual reproduction control is automatically ended when the first integration time in which the outlet temperature Tatout is equal to or higher than the reproduction determination temperature θ1 is equal to or longer than the first determination time T11, as in the automatic reproduction control.

In the temperature rising control represented in FIG. 4, the determination process of Step S103 is not executed thereafter in a case where the automatic reproduction control is ended in Step S109. In addition, the determination process of Step S105 is not executed thereafter in a case where the second condition for the stationary manual reproduction control request is established in Step S107.

[Automatic Reproduction Control]

Next, the automatic reproduction control in the present embodiment will be described with reference to FIGS. 8 to 14. The process of the automatic reproduction control represented in FIG. 8 is repeatedly executed at a predetermined cycle from the start (Step S102) to the end (Step S104 or Step S111) of the automatic reproduction control in the temperature rising control described with reference to FIG. 4.

In a case where the process represented in FIG. 8 is started, first, the temperature rising control performing unit 83 determines whether or not the vehicle safety state condition is established (Step S201). In the present embodiment, the vehicle safety state means a state where the work vehicle 1 does not operate (for example, a state where the engine 2 is operated at low idle and there is a low possibility that the operation of the work vehicle 1 that increases the output torque from that state is performed immediately). In addition, in the present embodiment, the operation means operating the work vehicle 1 except for an operation of operating the engine 2 in an idling state.

FIGS. 9 to 11 represent examples of the vehicle safety state condition. In the example represented in FIG. 9, the vehicle safety state condition (Example 1) is that Condition (1) is established and Condition (2-1) is established. In Condition (1), the accelerator openness is equal to or less than the accelerator openness threshold value for safety state determination (for example, the accelerator openness is about 0%, or 0% or more and 5% or less). Condition (2-1) is that the shift lever is at N and the parking brake is in operation. In the example represented in FIG. 10, the vehicle safety state condition (Example 2) is that Condition (1) is established and Condition (2-2) is established. In Condition (1), the accelerator openness is equal to or smaller than an accelerator openness threshold value for safety state determination. Condition (2-2) is that the travel lock is ON and the work machine lock is ON. A state where Condition (2-2) is established corresponds to a state where neither the traveling nor the work is performed. In the example represented in FIG. 11, the vehicle safety state condition (Example 3) is that Condition (1) is established and Condition (2-3) is established. In Condition (1), the accelerator openness is equal to or smaller than an accelerator openness threshold value for safety state determination. Condition (2-3) is that the work machine lock is ON. These are examples, and, for example, conditions such as all the work machine levers being at the neutral position may be combined. In addition, the vehicle safety state condition can vary depending on, for example, the type or specification of the work vehicle 1. For example, the vehicle safety state condition (Example 1) can be used for a vehicle such as a wheel loader, a dump truck, or a passenger car. In addition, the vehicle safety state condition (Example 2) can be used for a vehicle such as a bulldozer that moves a work machine while traveling. In addition, the vehicle safety state condition (Example 3) can be used for a vehicle such as a hydraulic shovel that moves a work machine without almost traveling.

In a case where the vehicle safety state condition is not established (Step S201: No), the temperature rising control performing unit 83 determines the ETV openness (throttle valve openness) based on an ETV openness MAP1 (throttle valve openness map1) for a case where the vehicle safety state condition is not established (Step S202). In a case where the vehicle safety state condition is established (Step S201: Yes), the temperature rising control performing unit 83 determines the ETV openness (throttle valve openness) based on an ETV openness MAP2 (throttle valve openness map2) for a case where the vehicle safety state condition is established (Step S203). The ETV openness MAP1 is one configuration of a first map according to the present disclosure, and the ETV openness MAP2 is one configuration of a second map according to the present disclosure.

FIG. 12 represents a configuration example of the ETV openness MAP1, and FIG. 13 represents a configuration example of the ETV openness MAP2. Both the ETV openness MAP1 represented in FIG. 12 and the ETV openness MAP2 represented in FIG. 13 are maps that define the valve openness by using the engine rotational speed and the torque as elements. The ETV openness MAP1 represented in FIG. 12 is different from the ETV openness MAP2 represented in FIG. 13 in that the upper limit value of the ETV openness is 86% in the ETV openness MAP1, but the upper limit value of the ETV openness is 95% in the ETV openness MAP2. In addition, the ETV openness MAP2 represented in FIG. 13 is set such that the value of the valve openness is larger than that of the ETV openness MAP1 represented in FIG. 12 in a region where the torque is smaller than 400. In addition, the ETV openness MAP2 represented in FIG. 13 is set such that the value of the valve openness is larger than that of the ETV openness MAP1 represented in FIG. 12 in a region of less than 1200 rpm. In this case, in the ETV openness MAP2 represented in FIG. 13, in a region where the torque is close to almost zero, and a region where the rotational speed is an idling rotational speed (rotational speed region in a state from low idle to idle-up), the valve openness has a state of further throttling the valve openness of the ETV openness MAP 1.

Then, the temperature rising control performing unit 83 determines whether or not the DOC inlet temperature is higher than a predetermined temperature threshold value (for example, 250° C. which is the temperature at which the DOC device 30 is activated) (Step S204). In a case where the DOC inlet temperature is not higher than the predetermined temperature threshold value (Step S204: No), the temperature rising control performing unit 83 determines the ETV openness by feedback control of setting the DOC inlet temperature to a target value (for example, 250° C.) (Step S205). In this case, in a case where the ETV openness MAP2 (second map) is selected in Step S205, when the DOC inlet temperature is equal to or lower than the predetermined threshold value, the temperature rising control performing unit 83 can also determine the valve openness to exceed the upper limit value defined in the ETV openness MAP2 (second map) such that the deviation between the DOC inlet temperature and the predetermined target value is reduced.

Then, the temperature rising control performing unit 83 controls the ETV openness based on the ETV openness determined in Step S202, S203, or S205 (Step S206). Then, in a case where the DOC inlet temperature is higher than a predetermined temperature threshold value (for example, 250° C. which is a temperature at which the DOC device 30 is activated) (Step S207: Yes), the temperature rising control performing unit 83 starts the fuel injection control for the automatic reproduction control. In a case where the DOC inlet temperature is equal to or lower than the predetermined temperature threshold value (Step S207: No), the temperature rising control performing unit 83 ends the fuel injection control for the automatic reproduction control. Here, the fuel injection control for the automatic reproduction control is fuel dosing control by the fuel injection device 72 or the like, and is control performed by, for example, the repetition process executed separately from the process represented in FIG. 8. The fuel injection amount is controlled by using a coefficient or a map for the automatic reproduction control from, for example, the inlet temperature measured by the inlet temperature sensor 31 or the outlet temperature measured by the outlet temperature sensor 45. In Step S208 and Step S209, in a case where the process has already started or has already ended, no process is executed.

Then, the engine rotational speed increase control performing unit 85 determines whether or not the accelerator openness is larger than a predetermined openness threshold value (Step S210), and sets the idling rotational speed for the automatic reproduction control in a case where the accelerator openness is larger than the predetermined openness threshold value (Step S211). In a case where the idling rotational speed is set for the automatic reproduction control once, the idling rotational speed is not changed until the automatic reproduction control is ended. The idling rotational speed for the automatic reproduction control is, for example, a rotational speed set to be higher than the normal rotational speed by a predetermined value or a predetermined ratio.

FIG. 14 represents an operation example of the automatic reproduction control by the above processes. FIG. 14 represents an example of a change in time of the DOC inlet temperature Tatin, the DOC outlet temperature Tatout, the reproduction time, the dosing fuel flow rate, and the valve openness of the throttle valve 20, with a horizontal axis as a time axis. FIG. 14 is an operation example in a case where the vehicle safety state condition is established. In addition, the ETV openness MAP2 is a case in which the example represented in FIG. 13 is used. In the example represented in FIG. 14, immediately after the start of the automatic reproduction control, the throttle valve openness is 95%. Then, the throttle valve openness increases from 95% until the DOC inlet temperature reaches 250° C., and at a time point t1 when the DOC inlet temperature exceeds 250° C., the throttle valve openness is again 95%. At a time point t2, the DOC outlet temperature is equal to or higher than the reproduction determination temperature θ1, and the reproduction time is increased. The automatic reproduction control is ended at a time point t3.

[Effects of Embodiment]

According to the present embodiment, in a case where control of increasing the exhaust temperature in the exhaust path is required, a state where the vehicle does not operate (for example, a state where the vehicle does not operate immediately due to a low idle operation) is detected, and the openness of the exhaust throttle valve is further throttled as compared with the openness before the detection, only in a case where the state is detected. According to this configuration, the control of further throttling the openness is performed in a case where the use environment of the exhaust throttle valve is stable. Thus, in a case where the control of throttling the throttle valve 20 is performed, it is possible to efficiently increase the temperature while avoiding deterioration in performance or the like. That is, according to the present embodiment, it is possible to appropriately control the openness of the exhaust throttle valve. In addition, since it is possible to efficiently increase the temperature in the automatic reproduction control, it is possible to reduce the frequency of the stationary manual reproduction.

Although the embodiment of the present invention has been described above in detail with reference to the drawings, the specific configuration is not limited to the above embodiment, and design modifications and the like are included within the scope of the gist of the present invention. For example, the ETV openness MAP1 represented in FIG. 12 and the ETV openness MAP2 represented in FIG. 13 may be maps that define the valve openness by using the engine rotational speed and the fuel injection amount (fuel injection amount of the fuel injection device 7) as elements. In addition, the control device 8 can be configured by using a computer, and a part or the entirety of a program executed by the computer can be distributed via a computer-readable recording medium or a communication line.

[Supplementary Notes]

The exhaust gas purification device 10 described in the embodiment can be ascertained as follows.

(1) An exhaust gas purification device 10 according to a first aspect of the present disclosure includes a throttle valve 20 configured to be provided in a path 11 through which an exhaust gas discharged from an engine 2 flows, a rotational speed of the engine 2 being controlled in accordance with an operation of an accelerator 61, a diesel oxidation catalyst device 30 configured to be disposed on a downstream side of the throttle valve 20, a selective reduction catalyst device 50 configured to be disposed on a downstream side of the diesel oxidation catalyst device 30, a fuel injection device 72

(7) configured to inject fuel on an upstream side of the diesel oxidation catalyst device 30, an inlet temperature sensor 31 configured to measure an inlet temperature of the diesel oxidation catalyst device 30, an outlet temperature sensor 45 configured to measure an outlet temperature of the diesel oxidation catalyst device, and a control device 8 configured to input temperature data measured by the inlet temperature sensor 31 and the outlet temperature sensor 45 and control the throttle valve 20 and the fuel injection device 72. In a case of performing control of throttling the throttle valve 20, the control device 8 changes an upper limit value of a valve openness when a fully closed condition of the throttle valve 20 is set as a maximum value of the valve openness and a fully open condition of the throttle valve 20 is set as a minimum of the valve openness, based on a determination result based on an accelerator openness of the accelerator 61 and operation conditions of one or more operation devices (62 to 66) different from the accelerator 61. According to the present aspect and each of the following aspects, it is possible to appropriately control the openness of the exhaust throttle valve.

(2) An exhaust gas purification device 10 according to a second aspect of the present disclosure is the exhaust gas purification device 10 in (1), in which the control device 8 selects any one of a first map (ETV openness MAP1) that defines the valve openness by using the rotational speed and a torque of the engine 2 as elements or a second map (ETV openness MAP2) in which the upper limit value of the valve openness is more than the upper limit value of the first map, and determines the valve openness to change the upper limit value of the valve openness. According to this aspect, it is possible to appropriately control the openness of the exhaust throttle valve with a simple configuration.

(3) An exhaust gas purification device 10 according to a third aspect of the present disclosure is the exhaust gas purification device 10 in (2), in which the second map is set such that a value of the valve openness is larger than that of the first map in a region where the torque is smaller than a predetermined value. According to this aspect, it is possible to perform control of further throttling the valve openness in a stable region where the magnitude of the torque, that is, the magnitude of the load is relatively small.

(4) An exhaust gas purification device 10 according to a fourth aspect of the present disclosure is the exhaust gas purification device 10 in (2) or (3), in which the second map is set such that a value of the valve openness is larger than that of the first map in a region where the rotational speed is smaller than a predetermined value. According to this aspect, it is possible to perform control to further throttling the valve openness in a stable region where the magnitude of the rotational speed is relatively small.

(5) An exhaust gas purification device according to a fifth aspect of the present disclosure is the exhaust gas purification device 10 in (2) to (4), in which, when the inlet temperature is equal to or lower than a predetermined threshold value in a case where the second map is selected, the control device 8 controls the valve openness to exceed the upper limit value defined in the second map such that a deviation between the inlet temperature and a predetermined target value is small. According to this aspect, it is possible to further throttle the openness.

INDUSTRIAL APPLICABILITY

According to the above-described aspect, the openness of the exhaust throttle valve is appropriately controlled.

REFERENCE SIGNS LIST

1 Work vehicle
2 Diesel engine
3 Turbocharger
6 Engine rotational speed detection device
7 Fuel injection device
8 Control device
9 Monitor
10 Exhaust gas purification device
11 Path
20 Throttle valve
30 Diesel oxidation catalyst device (DOC device)
31 Inlet temperature sensor
32 NOx sensor
40 Urea water injection system
41 Injection nozzle
42 Urea water tank
43 Pump unit
45 Outlet temperature sensor
50 Selective reduction catalyst device (SCR device)
52 NOx sensor
60 Operation device
61 Accelerator
62 Shift lever
63 Parking brake
64 Work machine lever
65 Work machine lock switch
66 Travel lock switch
70 DPF
71 DPF device
72 Fuel injection device
73 Vehicle controller
74 Outlet temperature sensor
81 Sensor data acquisition unit
82 Vehicle data acquisition unit
83 Temperature rising control performing unit
84 Notification instruction unit
85 Engine rotational speed increase control performing unit
91 Notification unit
92 Switch (stationary manual reproduction switch)

The invention claimed is:

1. An exhaust gas purification device comprising:

a throttle valve configured to be provided in a path through which an exhaust gas discharged from an engine flows, a rotational speed of the engine being controlled in accordance with an operation of an accelerator;

a diesel oxidation catalyst device configured to be disposed on a downstream side of the throttle valve;

a selective reduction catalyst device configured to be disposed on a downstream side of the diesel oxidation catalyst device;

a fuel injection device configured to inject fuel on an upstream side of the diesel oxidation catalyst device;

an inlet temperature sensor configured to measure an inlet temperature of the diesel oxidation catalyst device;

an outlet temperature sensor configured to measure an outlet temperature of the diesel oxidation catalyst device; and a control device configured to input temperature data measured by the inlet temperature sensor and the outlet temperature sensor and control the throttle valve and the fuel injection device, wherein, in a case of performing control of throttling the throttle valve, the control device changes an upper limit value of a valve openness when a fully closed condition of the throttle valve is set as a maximum value of the valve openness and a fully open condition of the throttle valve is set as a minimum of the valve openness, based on a determination result based on an accelerator openness of the accelerator and operation conditions of one or more operation devices different from the accelerator.

2. The exhaust gas purification device according to claim 1, wherein the control device selects any one of a first map that defines the valve openness by using the rotational speed and a torque of the engine as elements, or a second map in which the upper limit value of the valve openness is more than the upper limit value of the first map, and determines the valve openness to change the upper limit value of the valve openness.

3. The exhaust gas purification device according to claim 2, wherein, when the inlet temperature is equal to or lower than a predetermined threshold value in a case where the second map is selected, the control device controls the valve openness to exceed the upper limit value defined in the second map such that a deviation between the inlet temperature and a predetermined target value is small.

4. The exhaust gas purification device according to claim 2, wherein the second map is set such that a value of the valve openness is larger than that of the first map in a region where the torque is smaller than a predetermined value.

5. The exhaust gas purification device according to claim 4, wherein the second map is set such that a value of the valve openness is larger than that of the first map in a region where the rotational speed is smaller than a predetermined value.

6. The exhaust gas purification device according to claim 5, wherein, when the inlet temperature is equal to or lower than a predetermined threshold value in a case where the second map is selected, the control device controls the valve openness to exceed the upper limit value defined in the second map such that a deviation between the inlet temperature and a predetermined target value is small.

7. The exhaust gas purification device according to claim 4, wherein, when the inlet temperature is equal to or lower than a predetermined threshold value in a case where the second map is selected, the control device controls the valve openness to exceed the upper limit value defined in the second map such that a deviation between the inlet temperature and a predetermined target value is small.

8. An exhaust gas purification method that is a control method of an exhaust gas purification device including a throttle valve configured to be provided in a path through which an exhaust gas discharged from an engine flows, a rotational speed of the engine being controlled in accordance with an operation of an accelerator, a diesel oxidation catalyst device configured to be disposed on a downstream side of the throttle valve;

a selective reduction catalyst device configured to be disposed on a downstream side of the diesel oxidation catalyst device, a fuel injection device configured to inject fuel on an upstream side of the diesel oxidation catalyst device;

an inlet temperature sensor configured to measure an inlet temperature of the diesel oxidation catalyst device, an outlet temperature sensor configured to measure an outlet temperature of the diesel oxidation catalyst device, and a control device configured to input temperature data measured by the inlet temperature sensor and the outlet temperature sensor and control the throttle valve and the fuel injection device, the exhaust gas purification method comprising:

changing, in a case of performing control of throttling the throttle valve, an upper limit value of a valve openness when a fully closed condition of the throttle valve is set as a maximum value of the valve openness and a fully open condition of the throttle valve is set as a minimum of the valve openness, based on a determination result based on an accelerator openness of the accelerator and operation conditions of one or more operation devices different from the accelerator.

9. A control device in an exhaust gas purification device including a throttle valve configured to be provided in a path through which an exhaust gas discharged from an engine flows, a rotational speed of the engine being controlled in accordance with an operation of an accelerator, a diesel oxidation catalyst device configured to be disposed on a downstream side of the throttle valve;

a selective reduction catalyst device configured to be disposed on a downstream side of the diesel oxidation catalyst device, a fuel injection device configured to inject fuel on an upstream side of the diesel oxidation catalyst device;

an inlet temperature sensor configured to measure an inlet temperature of the diesel oxidation catalyst device, and an outlet temperature sensor configured to measure an outlet temperature of the diesel oxidation catalyst device, wherein the control device inputs temperature data measured by the inlet temperature sensor and the outlet temperature sensor and controls the throttle valve and the fuel injection device, and in a case of performing control of throttling the throttle valve, the control device changes an upper limit value of a valve openness when a fully closed condition of the throttle valve is set as a maximum value of the valve openness and a fully open condition of the throttle valve is set as a minimum of the valve openness, based on a determination result based on an accelerator openness of the accelerator and operation conditions of one or more operation devices different from the accelerator.

* * * * *